UNITED STATES PATENT OFFICE.

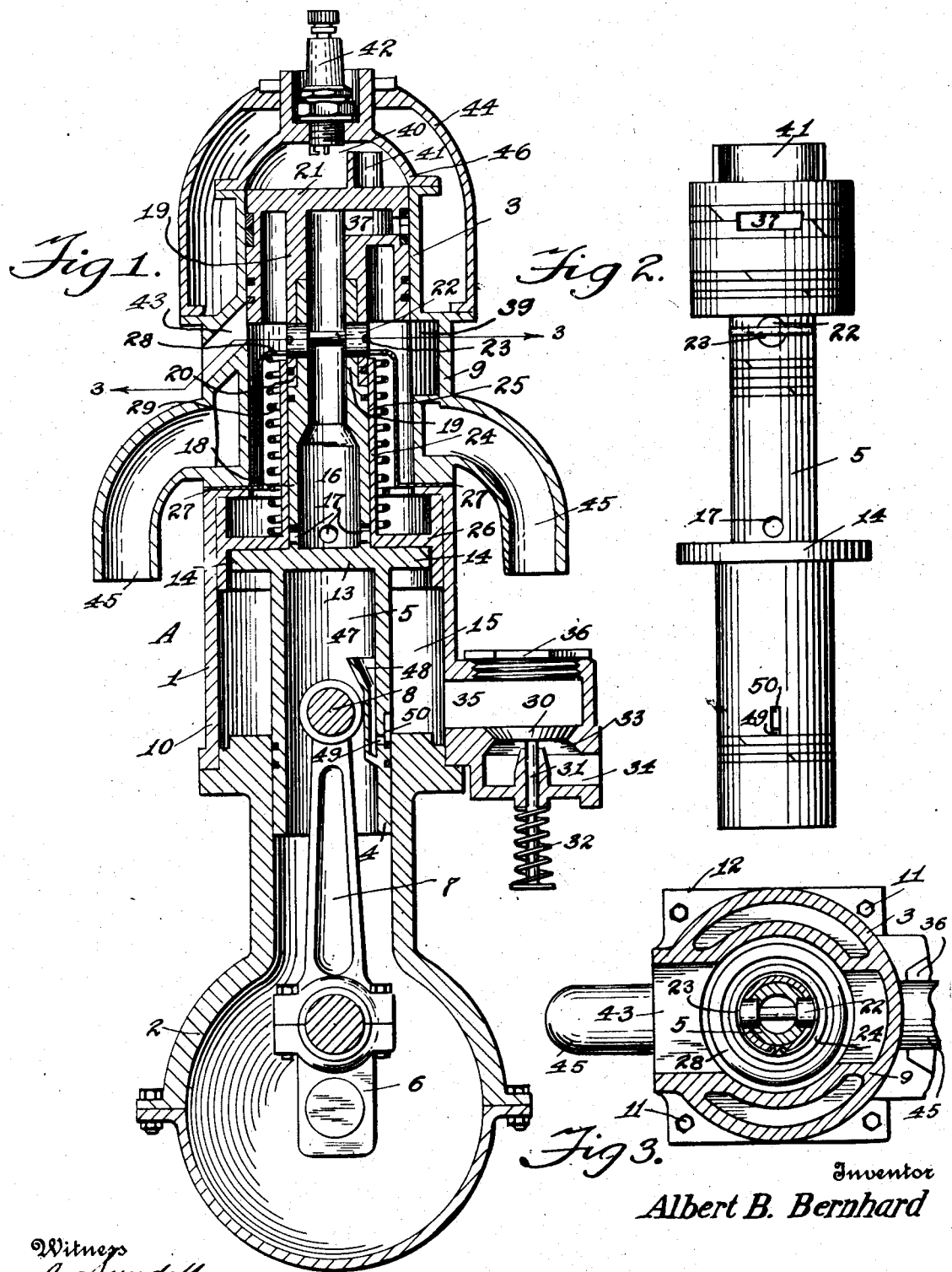

ALBERT B. BERNHARD, OF COLUMBUS, OHIO.

INTERNAL-COMBUSTION ENGINE.

1,345,065.  Specification of Letters Patent.  Patented June 29, 1920.

Application filed June 26, 1919. Serial No. 306,886.

*To all whom it may concern:*

Be it known that I, ALBERT B. BERNHARD, a citizen of the United States, residing at Columbus, in the county of Franklin and State of Ohio, have invented certain new and useful Improvements in Internal-Combustion Engines, of which the following is a specification.

This invention relates broadly to internal combustion engines, and has particular reference to internal combustion engines of the two cycle variety.

The primary object of the invention resides in the provision of a two cycle internal combustion engine wherein is embodied an improved and efficient structure for effecting the introduction of fuel into the combustion chamber of the engine, in order that the fuel admitted into the combustion chamber will be uniformly regulated at all periods of engine operation and in proper and desired proportions, this manner of introducing fuel into the combustion chamber serves to provide an engine of the two cycle variety capable of a wide range of rotational speed in order that the same may be throttled to run at a very low speed and with equal facility and reliability at relatively high speeds, the variations in speeds being accompanied by smoothness in operation and with substantially an entire absence of mis-firing. By producing the two cycle motor capable of being readily throttled to assume various speeds, an engine is provided which is particularly adaptable for automobile purposes.

A further object of the invention resides in a two cycle engine of the above character wherein is embodied an improved lubricating system, the system being such that the oil contained in the crank case of the engine remains clear and uncontaminated of foreign matter and is prevented from being mixed with the source of fuel employed. The oil in the crank case is further spaced from the combustion chamber of the engine in order that the heat of the latter will not cause the oil to cake into particles of carbon and then fall into the oil contained in the crank case.

With these and other objects in view, as will appear as the description proceeds, the invention accordingly consists in the novel features of construction, combination of elements and arrangement of parts, hereinafter to be fully described and to have the scope thereof pointed out in the appended claims.

In the accompanying drawings, forming a part of the present specification and in which:

Figure 1 is a vertical sectional view taken through an internal combustion engine constructed in accordance with the principles of the invention.

Fig. 2 is a side elevation of the main piston, and,

Fig. 3 is a horizontal sectional view taken along the line 3—3 of Fig. 1.

In the form of the invention disclosed in the drawings, the engine A is formed to include a cylinder structure 1. This structure consists essentially of a two part crank case, the upper part of which terminates in a cylinder 3, in which is mounted for reciprocation, the lower end 4 of a main piston 5. A crank shaft 6 is journaled as usual for rotation within the crank case and an ordinary connecting rod 7 extends from said crank shaft to the cross pin 8 of the piston 5, in order that the rectangular motion of the piston may be transformed to rotary motion on part of the crank shaft.

The cylinder structure 1 further consists of a pair of vertically registering upper and lower sections 9 and 10, which are united by means of bolts 11 in rigidly secured relation, the lower end of the section 10 being seated upon the upper shouldered portion 12 of the upper part of the crank case 2 forming the cylinder 3. The piston 5 is formed at a point within the section 10 with a transverse cross web 13 and with an annular outstanding flange 14, which is arranged for reciprocation within a fuel receiving chamber 15 defined by the lower section 10. Above the web 13, the diameter of the piston is somewhat reduced and said piston is provided with a central bore or passageway 16, which latter is capable of being in communication with the chamber 15 by means of radial ports 17, formed in the wall of said piston and located immediately above the web 13. The reduced portion 18 of the piston above the web 13 terminates in a reduced ferrule 19, which is adapted to receive a sleeve 20 formed on the lower end of the upper portion 21 of said piston, and a pin 22 is adapted to pass transversely through the telescopic portions 19 and 20 in order to rigidly unite the latter in assembled relation. The pin 22 is preferably held against displacement by means of a small wire ring 23, which is disposed to engage with the ends of the pin so that lateral movement on part of the latter will be normally prevented. It will thus be manifest that a structure has been devised for securing the separable portions of the piston in united relation.

Arranged for sliding movement within the chamber 15 and concentrically carried by the portion 18 of said piston is an auxiliary piston 24. In this instance, the latter comprises a tubular extension 25 which is arranged to surround the upper part 18 of the main piston and is formed with an offset ring portion 26 which engages with the wall of the chamber 15. Clamped between the cylinder sections 9 and 10 is a frame 27, preferably formed from thin sheet metal, which has its upper end formed with an annular offset 28 against which one end of a coiled spring 29 is seated, the opposite end of said spring being disposed to engage with the ring portion 26 of the auxiliary piston in order that the latter will be forced toward the offset flange 14 of the main piston.

In order to introduce fuel into the chamber 15, use is made of a valve mechanism 30. This mechanism may be of any desired type but in this instance has been conventionally shown as comprising a valve 31 which is arranged to seat by means of a spring 32 in order to normally close a fuel inlet port 33. It will thus be apparent that the valve 31 operates to govern the flow of vaporized fuel from the passageway 34, connecting the engine with a suitable carbureter, and with a recess 35 which is in open communication with the chamber 15. The casing for the valve 31 may be formed by offsetting the wall of the lower cylinder section 10. A threaded cap 36 may also be used in order that access may obtain with respect to the valve 31 and its associated port 33. It will thus be apparent that upon the compression stroke of the piston, the auxiliary piston will be caused to move in unison therewith by the engagement of the flange 14 with the ring portion 26 of the auxiliary piston, thus causing the latter to travel upwardly in the chamber 15 against the influence exercised by its spring 29. The upward movement of the auxiliary piston creates a partial vacuum within the chamber 15 which results in the elevation of the valve 31 by virtue of atmospheric pressure, so that fuel conducted from the carbureter may flow into the chamber 15. Upon the firing stroke of the piston, the auxiliary piston will be maintained in an elevated position, unsupported by the main piston, by virtue of the action of the gaseous fuel vapors contained within the chamber 15, and said auxiliary piston will be thus buoyantly supported until the main piston substantially reaches its lowermost point of travel. By maintaining the auxiliary piston immovable during the downward stroke of the main piston, the port 17 of the latter will be uncovered, so that fuel may flow from the chamber 15, through said ports 17 and thence upwardly through the bore or passageway 16 of the piston.

The bore or passageway 16 in the lower portion 18 of the main piston is in direct communication with an L shaped passageway 37 formed in the upper portion 21 of the main piston. The passageway 37 is normally closed by the wall of the upper section 9, however, when the piston reaches the limit of its downward stroke, said passageway 37 will register with the lower portion of a pocket 39, formed in the wall of the upper section 9, and said pocket 39 is of sufficient height, when the piston is at its lowest point of movement, to extend above the top of said piston, in order that the gases contained within the passageways 16 and 37 may find vent from the piston by flowing into the pocket 39 and thence over the top of the piston into the firing or combustion chamber 40 of the cylinder structure. It will be apparent that as long as the gases are confined within the chamber 15 and within the passageways 16 and 37, the auxiliary piston will be maintained in its buoyantly supported position within said chamber 15. However, upon the release of the gases, caused by the flowing of the latter into the combustion chamber 40, said auxiliary piston will no longer be held in its suspended position, but will respond to the influence of its spring 29 and will be forced downwardly within the chamber 15 so as to effect the positive expulsion of the fuel vapors therefrom, thus causing a positive and forced flow of the fuel vapors from the chamber 15, through the passageways 16 and 37 and into the combustion chamber, where said gases are compressed by the subsequent compressor stroke on part of said piston. In order to prevent rattling or undue frictional contact between the ring portion 26 of the auxiliary piston and the flange 14 of the main piston, when said auxiliary piston is forced downwardly by the release of the fuel from the chamber 15, it will be observed that the ring portion 26 is downwardly extended so as to be capable of overlapping the flange 14. Thus when the auxiliary piston is caused to sharply descend by reason of its spring 29, an air pocket is formed between said ring portion and the flange 14, so that when the ring portion receives said flange, air will be compressed between the two relatively movable parts and in this manner the descent of the auxiliary piston will be arrested by the air pocket thus formed. This structure serves to insure a quietly running engine and prevents undue wear between parts.

Fuel introduced into the chamber 40 upon the registration of the passageway 37 with the pocket 39 is directed against a baffle plate 41 and thence upwardly into the chamber 40, so that the same will be compressed for combustion upon the next upward stroke on part of the main piston. The usual spark plug 42 or its equivalent is employed to ignite the compressed charge within the chamber 40. Upon the down stroke of the piston, the products of combustion are allowed to escape through the exhaust port 43, which is so arranged that the exhaust of the burnt gases will substantially take place before the fuel charge is admitted into the chamber 40. However, the expulsion of the exhaust products is furthered by the inflow of the fuel charge. Upon the up stroke of the piston, the exhaust port 43 is closed, and the fuel charge contained within the chamber 40 is then compressed and ignited upon the completion of the compression stroke. It will be observed that the upper end of the combustion chamber is not provided with lateral valve receiving offsets, but that the entire force of the fuel explosion will be directly received by the piston, thus tending toward efficiency in motor operation. Owing to the relationship existing between the exhaust port 43 and the pocket 39, a thorough scavenging of the burnt products of combustion from the combustion chamber 40 is insured. The upper cylinder section 9 may be cooled in any suitable manner, but in this instance a dome 44 has been provided which surrounds the upper portion of the cylinder structure so that an ample flow of water may be provided to effect the cooling of the cylinder structure. Ducts 45 may be utilized in effecting the introduction of water into the jacketing space. The usual removable head 46 is provided upon the upper end of the cylinder section 9, which head receives the sparking device 42.

In order to effect the lubrication of the engine above described, a suitable quantity of lubricant may be contained within the crank case 2 whereby upon the rotation of the crank shaft and associated parts, this oil or lubricant will be agitated to such extent as to engage with the walls of the cylinder 3 and also to splash into the hollow end 47 of the lower end of the main piston. In order to convey the lubricant into the upper parts of the cylinder structure so as to engage with the movable parts located therein, the lower hollow portion 47 of the main piston is provided with a funnel 48, which is so arranged as to receive such oil as is splashed into the piston. The lower end of this hollow communicates with a horizontal opening 49, which terminates in a vertically disposed passageway 50, the latter being in communication with the chamber 15. Thus the oil deposited into the funnel 48 will flow from the latter by way of the openings 49 and 50 into the fuel receiving chamber 15, whence it will be entrained by fuel within said chamber and will be forced into engagement with the wall thereof so as to facilitate the operation of the auxiliary piston. The oil is then further conveyed, by being entrained with the fuel, upwardly through the communicating passageways 16 and 37 until the same is brought into engagement with the wall of the cylinder section 9 in which the upper end 21 of the main piston operates, thus effecting the lubrication of this movable part. From this it will be manifest that lubricant delivered into the chamber 15 may be employed repeatedly, since if any of the oil should flow back into the chamber 15, the same will be used over again by being entrained with the fuel. In many internal combustion engines, the lubricant which splashes into the hollow interiors of pistons becomes heated to such extent that flaky particles of carbon are formed, which drop into the crank case and eventually gain access between joints of relatively movable parts and seriously interfere with the smoothness of operation of the engine. This condition is obviated in the present invention, inasmuch as the web 13 is maintained in a relatively cool condition since the same is not directly exposed to the heat of the combustion chamber 40, thus the formation of such carbon deposit is prevented. Also such gasolene as is not completely burned within the chamber 40 will not mingle with the oil contained in the crank case, owing to the fact that this condensed fuel even when flowing past the rings of the main piston will simply drop into the fuel chamber 15, whence it will be entrained by the incoming fuel and again subjected to the processes of combustion. The engine thus provides two essential features of economy in engine operation, namely, the complete utilization of all fuel introduced therein, and a maximum use of its lubricant, which is primarily effected by the complete use of the oil and by the fact that the main body of the latter does not contaminate either by flaky particles of carbon or by condensed fuel matter.

I claim:

1. A two cycle internal combustion engine comprising a cylinder structure, a main piston mounted for reciprocation within said cylinder structure and formed to divide the latter into spaced combustion and fuel receiving chambers, an auxiliary piston mounted for reciprocation within said fuel receiving chamber, valve mechanism responsive to the compression stroke of said main piston and the movement of said auxiliary piston to introduce a charge of fuel into said fuel receiving chamber, whereby upon the completion of said compression stroke, said fuel charge will be confined within said compression chamber to effect the suspension of said auxiliary piston therein, and port means coöperative with said main piston and operable upon substantially the completion of the impulse stroke of said main piston to establish communication between the fuel receiving chamber and said combustion chamber, whereby said auxiliary piston will be released to effect the positive advance of fuel from said fuel receiving into said combustion chamber.

2. A two cycle internal combustion engine comprising a cylinder structure, a main piston mounted for reciprocation within said cylinder structure and formed to divide the latter into normally spaced combustion and fuel receiving chambers, an auxiliary piston slidably received by said main piston and mounted for reciprocation within said fuel receiving chamber, valve mechanism responsive to the compression stroke of said main piston and the accompanying movement of said auxiliary piston to introduce a charge of fuel into said fuel receiving chamber and to effect the suspended support of said auxiliary piston therein, port means coöperative with said main piston and operable upon the substantial completion of the impulse stroke of said main piston to establish communication between said fuel receiving chamber and said combustion chamber, and spring means acting upon said auxiliary piston to effect the positive discharge of fuel from said fuel receiving chamber into said combustion chamber when said port means have properly registered.

3. A two cycle internal combustion engine comprising a cylinder structure, a main piston mounted for reciprocation within said cylinder structure and formed to divide the latter into spaced combustion and fuel receiving chambers, an auxiliary piston slidably received by said main piston and mounted for reciprocation within said fuel receiving chamber, valve mechanism responsive to the compression stroke of said main piston and the accompanying movement of said auxiliary piston to introduce a charge of fuel into said fuel receiving chamber, whereby upon the completion of said compression stroke, said valve mechanism will be closed and said auxiliary piston will be suspended within its chamber by the buoyancy of the fuel charge therein, vertically disposed port means passing centrally through said main piston and operable upon the substantial completion of the impulse stroke of said piston to establish communication between said fuel receiving chamber and said combustion chamber, whereby an auxiliary piston will be released to effect the positive advance of fuel into said combustion chamber.

4. A two cycle internal combustion engine comprising a cylinder structure, a main piston mounted for reciprocation within said cylinder structure and formed to divide the latter into spaced fuel receiving and combustion chambers, a support formed upon said piston at a position within said fuel receiving chamber, an auxiliary piston slidably received by said main piston, spring means coöperative with said auxiliary piston and tending to force the latter toward said support, whereby upon the compression stroke of said piston, said spring will be compressed, valve mechanism responsive to the compression stroke of said main piston and said auxiliary piston to introduce a charge of fuel into said fuel receiving chamber, said fuel serving to support said auxiliary piston within its chamber, port means disposed for registration upon substantially the completion of the impulse stroke of said piston in order to conduct fuel from said fuel receiving chamber to said combustion chamber, said discharge of fuel into said combustion chamber being positively effected by the action of said spring upon said auxiliary piston, and means formed with said auxiliary piston coöperative with said support to arrest the fall of said auxiliary piston upon said support.

5. A two cycle engine comprising a cylinder structure, a main piston mounted for reciprocation within said cylinder structure and formed to divide the latter into spaced fuel receiving and combustion chambers, an auxiliary piston slidably mounted within said fuel receiving chamber and movable in unison with the main piston upon its compression stroke, valve mechanism responsive to the compression stroke of said main piston with the accompanying movement of said auxiliary piston to effect the introduction of a fuel charge into said fuel receiving chamber, means for introducing a lubricant into said fuel receiving chamber, port means formed in said main piston and operable upon the completion of the impulse stroke of the latter to establish communication between said fuel receiving chamber and said combustion chamber, and spring means coöperative with said auxiliary piston to effect the positive advance of the fuel charge into said combustion chamber.

6. A piston for internal combustion engines comprising a lower tubular portion, a transversely disposed cross web formed at the upper end of said tubular portion, a sleeve extension formed above said cross web and having a vertically extending passageway formed therein, said passageway being in communication at its lower end with the exterior of said piston by means of transverse ports, an upper head portion telescopically connected with said sleeve extension, said upper head portion having a passageway formed therein communicating with said sleeve passageway, and means for uniting said sleeve extension with the upper head portion of said piston.

7. A piston for internal combustion engines comprising a substantially tubular lower portion, a lubricant conducting structure formed internally of said tubular lower portion and connecting the interior of the latter with the exterior thereof, a cross web disposed transversely at the upper end of said tubular portion, a sleeve extension projecting upwardly from said cross web and provided with a vertical fuel passageway, said passageway being in communication with the exterior of said piston by means of transverse ports disposed above said web, and a head for said piston carried by said sleeve extension and formed with a fuel passageway in communication with said sleeve passageway.

In testimony whereof I affix my signature.

ALBERT B. BERNHARD.